Aug. 11, 1964   A. AINSWORTH   3,144,140
MANIPULATING DEVICE
Filed Aug. 23, 1961                             6 Sheets-Sheet 6

INVENTOR:

BY 3,144,140
Patented Aug. 11, 1964

3,144,140
MANIPULATING DEVICE
Alan Ainsworth, Thurso, Caithness, Scotland, assignor to United Kingdom Atomic Energy Authority, London, England
Filed Aug. 23, 1961, Ser. No. 133,494
Claims priority, application Great Britain Sept. 1, 1960
6 Claims. (Cl. 214—1)

This invention relates to manipulators of the kind comprising an arm assembly supported on and slidable in a pivot, the arm assembly having at one end an operating mechanism and at the other end a manipulating mechanism responsive to the operating mechanism.

Such devices find common use in the handling of radioactive or toxic materials, a common form of the device providing tong facilities by an arm supported on and slidable in a ball socket. While this common form is compact and simple in design it suffers from the disadvantage of only providing limited access to the materials being handled. To obtain greater access and more extensive manipulating facilities, manipulators of the kind known as master/slave manipulators are used. These are extremely complicated and expensive pieces of apparatus and require good availability of head room.

The present invention resides in a manipulator of the kind described wherein the arm assembly is jointed between the pivot and the end having the manipulating mechanism, said joint being movable under control of the operating mechanism.

By way of example, the invention will now be described with reference to the accompanying drawings in which:

FIGURE 1A is an enlarged sectional view of a part of FIG. 1,

Figure 1:
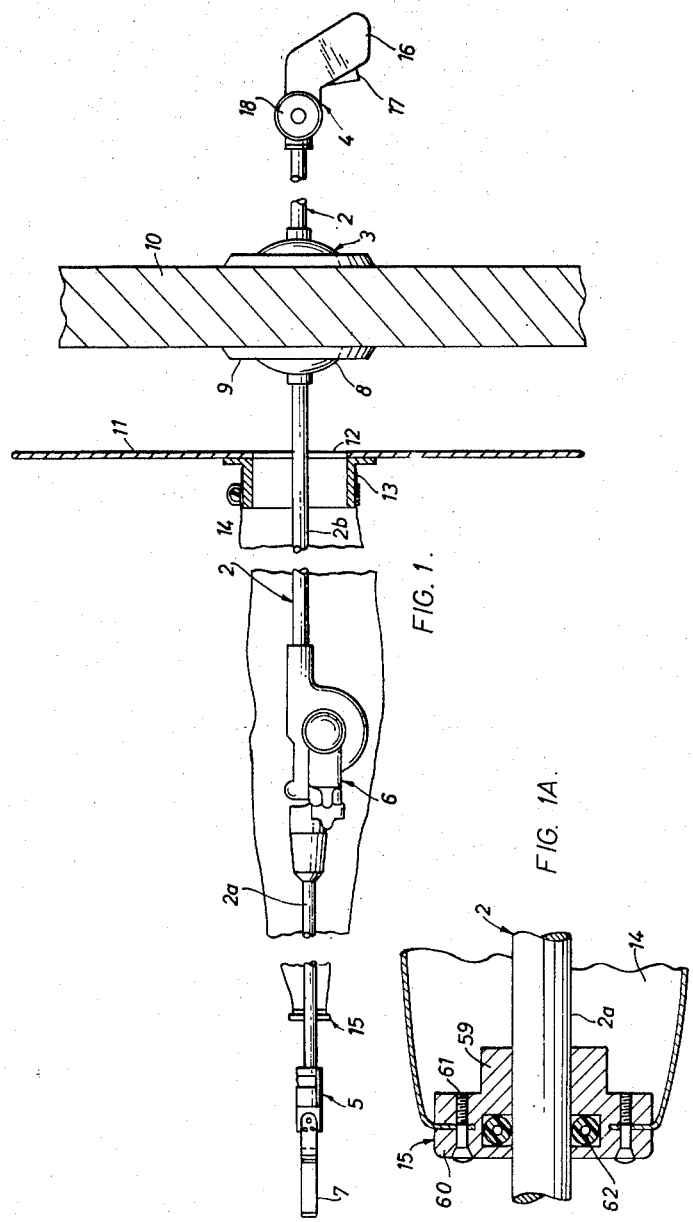
FIGURE 1 is a side view of the manipulator with its joint.

FIGURE 1 shows a manipulator comprising an arm assembly 2 supported on and slidable in a pivot 3, the assembly 2 having at one end an operating mechanism 4 and at the other end a manipulating mechanism 5 responsive to the operating mechanism 4. The arm assembly 2 comprises an arm 2b and an arm extension 2a jointed at joint 6 between the pivot 3 and the manipulating mechanism 5, the joint 6 being movable under the control of the operating mechanism 4. The manipulating mechanism 5 comprises two tong jaws (one of which is shown and designated 7). The pivot 3 comprises a ball 8 pivotable in a housing 9 mounted in a shielding wall 10 surrounding a box having a side wall 11. The wall 11 has a port 12 through which the arm 2b passes. A flanged ring 13 is sealed to the wall 11 round the port 12 and a polyvinylchloride sleeve 14 is sealed at one end to the ring 13 and at the other end to the arm extension 2a by a sealing gland 15 between the manipulating mechanism 5 and the joint 6. The operating mechanism 4 comprises a handle 16, a trigger 17 and two rotatable hand wheels (one of which is shown and designated 18) mounted on opposite sides of the handle 16.

FIG. 1A shows the gland 15 comprising a seal body 59 to which a clamping plate 60 is clamped by screws 61 so as to seal the end of the sleeve 14 and compress a circular section flexible sealing ring 62 on the arm extension 2a.

Figure 2:
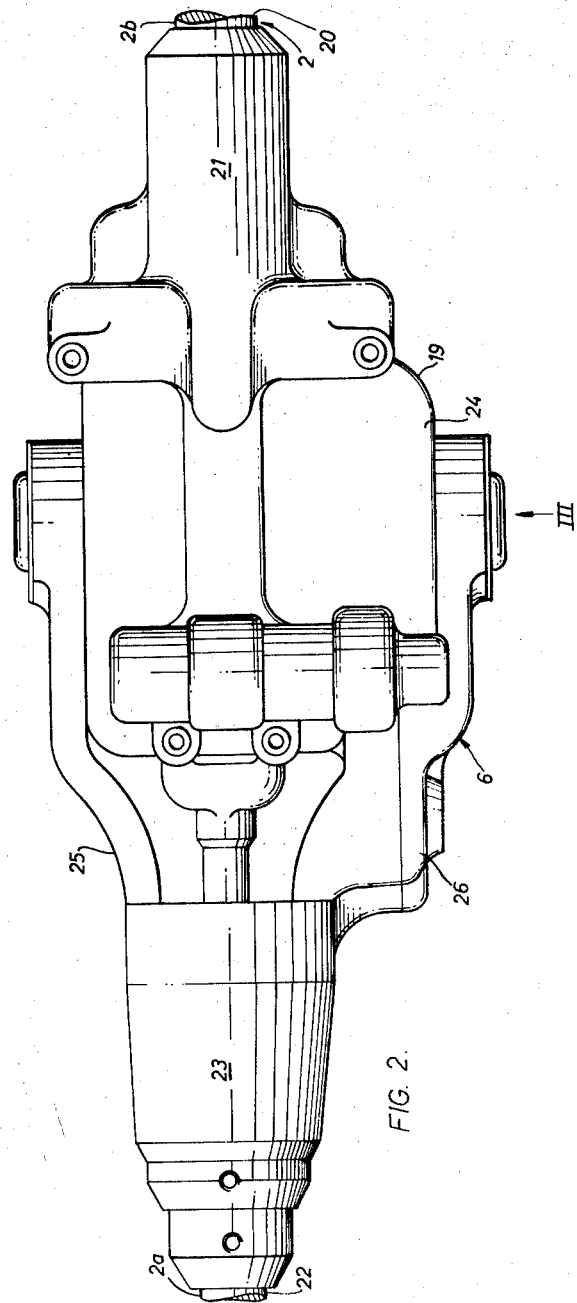
FIGURE 2 is a plan view of the joint.
Figure 3:
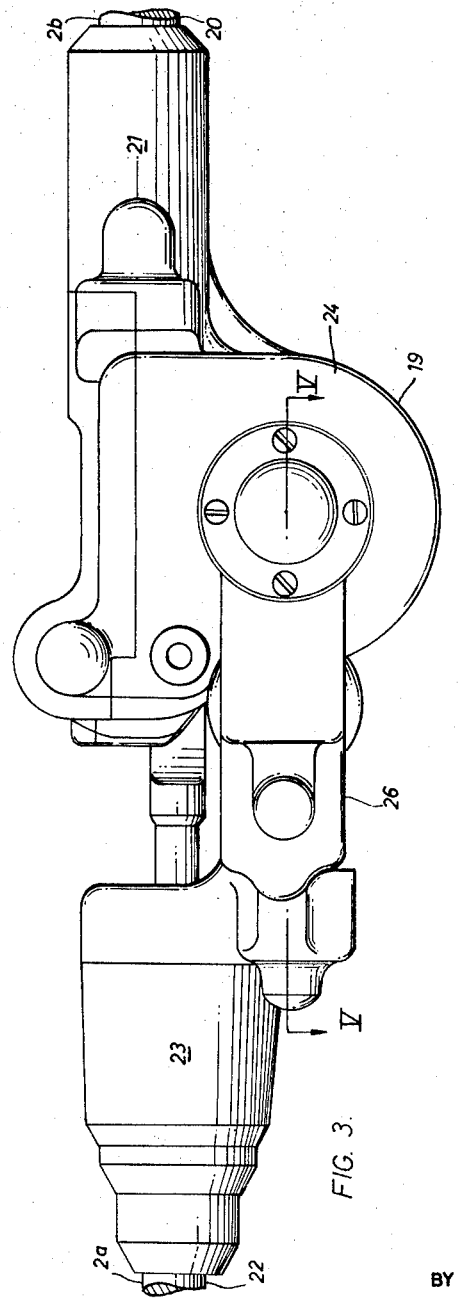
FIGURE 3 is a side view in the direction of arrow III of FIG. 2.
Figure 4:
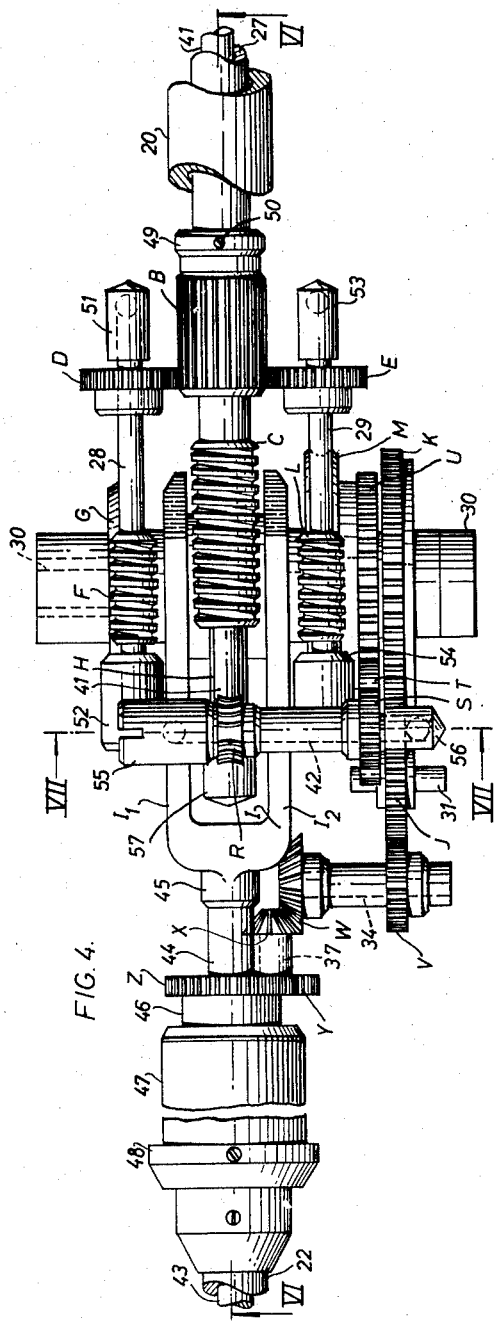
FIGURE 4 is a plan view of the joint with its casing removed.
Figure 5:
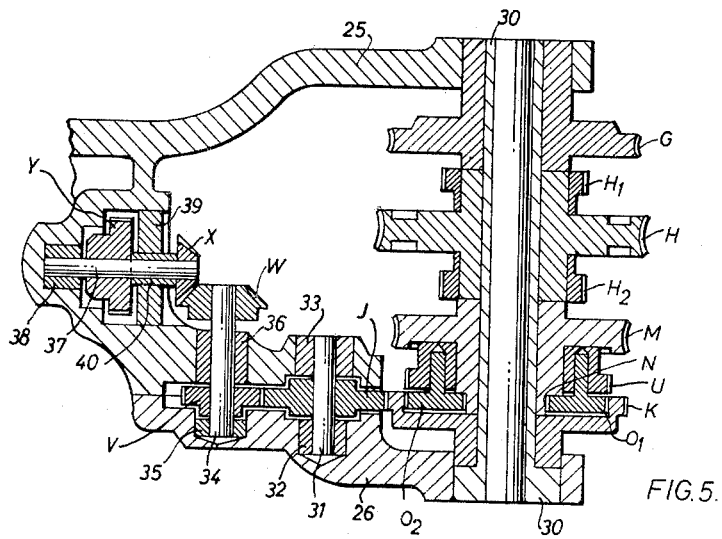
FIGURE 5 is a section on the line V—V of FIGURE 3.
Figure 7:
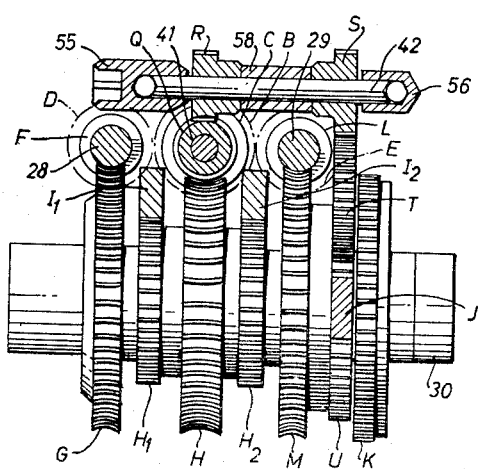
FIGURE 7 is a section on the line VII—VII of FIGURE 4.
Figure 6:
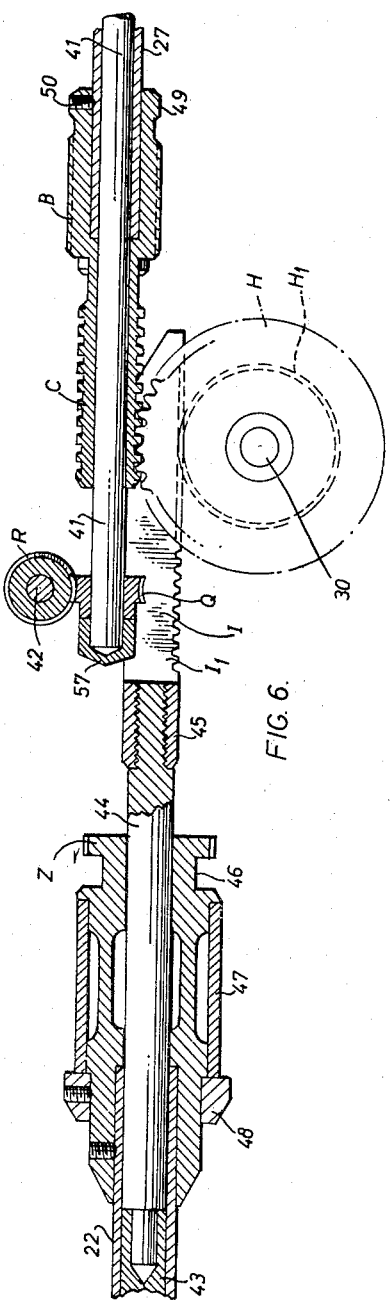
FIGURE 6 is a section on the line VI—VI of FIGURE 4.

Reference is now directed to FIGS. 2 to 7 in which FIGS. 2 and 3 show the joint 6 enclosed in a casing 19 and FIG. 4 shows the joint 6 with the casing 19 removed.

Referring to FIGS. 2 and 3, the arm 2b comprises an outer tube 20 joined to a tubular part 21 of the casing 19. The arm extension 2a has an outer tube 22 extending from the mechanism 5 into a conical part 23 of the casing 19. The conical part 23 has two integral arms 25, 26 extending to a joint axle 30 mounted in a body part 24 of the joint casing 19; the part 23 and arm 25, 26 form a yoke which is rigidly secured to the joint axle and in which the arm extension is journalled.

Referring to FIGS. 4 to 7, a tubular shaft 27, which is rotatably and slidably housed in the tube 20, has fixed to it a gear B to which is fixed a worm C, the gear B having a boss 49 secured to the shaft 27 by a screw 50. A shaft 28 parallel to the shaft 27 has fixed to it a gear D and a worm F, the gear D meshing with the gear B. A shaft 29 also parallel to the shaft 27 has fixed to it a gear E and a worm L, the gear E meshing with the gear B.

The joint axle 30 which is transverse to the shaft 27 carries a first gear G which is fixed to the axle 30 and the yoke so that rotation of the gear G causes pivotal movement of the arm extension 2a with respect to the arm 26. A second gear U which is mounted for rotation about the axle 30 is connected through a gear train including gears J, W, X, Y, and Z with the outer tube 22 of the arm extension 2a so that rotation of the second gear causes rotation of the arm extension with respect to the arm. Compensating mechanism, comprising a third gear M mounted for rotation on the axle 30 and epicyclic gearing N, $O_1$, $O_2$, and K interposed between the second gear and the gear train, restrains interference between rotational and pivotal movements of the arm extension with respect to the arm.

In more detail the gears carried by the joint axle 30 are the first gear G which meshes with the worm F, a gear H meshing with the worm C, gears $H_1$, $H_2$ fixed to opposite sides of the gear H, the third gear M meshing with the worm L, a sun gear N which is fixed to the third gear M and forms part of the epicyclic gearing, the second gear U which is carried by the gear M for rotation about the joint axle 30 independently of the gear M, and a ring gear K which also forms part of the epicylic gearing. The gear G as well as being fixed to the axle 30 is fixed to the arm 25 and the other end of the axle 30 is fixed to the arm 26. The epicyclic gearing comprises the sun gear N, the ring gear K, and two diametrically opposed planetary gears $O_1$ and $O_2$ which are mounted in the gear U. The ring gear K which meshes internally with the planetary gears also meshes externally with the gear J of the gear train. The gears of the gear train are mounted as follows. The gear J is fixed to a shaft 31 which is mounted in the arm 26 by bushes 32, 33. The gear V, which meshes with the gear J, is fixed to a shaft 34 which is mounted in the arm 26 by bushes 35, 36. Also fixed to the shaft 34 is the bevel gear W which meshes with the bevel gear X. The bevel gear X is fixed to a shaft 37 which is mounted in the arm 26 by bushes 38, 39. Also fixed to the shaft 37 is the gear Y which is spaced from the bevel gear X by a spacer 40. This gear Y meshes with the gear Z which is fixed to the tube 22. The gear Z has a stepped portion 46 and has also fixed to it a bearing sleeve 47 and a collar 48, the sleeve 47 being housed in the conical part 23 of the casing 19 which abuts the collar 48.

A concentric shaft 41 is housed in the shaft 27. These concentric shafts 27, 41 extend in the tube 20 to the mechanism 4, one of the hand wheels 18 being connected to rotate the shaft 27 and the other to rotate the shaft 41. The concentric shaft 41 has fixed to it a gear Q which meshes with a gear R. The gear R is fixed to a shaft 42 which is parallel to the axle 30. Also fixed to the shaft 42 is a gear S which meshes with a gear T which in turn meshes with a gear U. The gear R is spaced from the gear S by a spacer 58. The shaft 28 is carried in bushes 51, 52, the shaft 29 is carried in bushes 53, 54, and the shaft 42 is carried in bushes 55, 56, the bushes 51 to 56 being mounted in the casing 19. Similarly a shaft (not shown) for the gear T is mounted in the casing 19 by bushes, and the end of the shaft 41 to which the gear Q is fixed is carried in a bush 57 which is mounted in the casing 19.

The rotatable tube 22 houses a slidable rod 43 extending from the mechanism 5 and joined to a slidable rod 44 which is screwed into a boss 45 of a rack I. The rack I has two arms $I_1$, $I_2$ which mesh respectively with the gears $H_1$, $H_2$.

In use of the device 1 for handling radioactive or toxic materials inside the box having the side wall 11, the device is operated externally of the box to provide movement of the device 1 within the box by sliding the arm assembly 2 and pivoting the support 3, rotation of the mechanism 5 and swinging of the arm extension 2a using the operating mechanism 4, and opening and closing of the jaws 7 also using the mechanism 4. (The jaws 7 have a pivoted link mechanism of known type such that axial movement of the rod 43 relative to the tube 22 opens and closes the jaws 7.)

Swinging of the arm extension 2a relative to the arm 2b about the axis of the axle 30 is achieved by rotation of the shaft 27 using the hand wheel 18. Rotation of the shaft 27 rotates the gear B which drives the gear D thus rotating the worm F which in turn drives the first gear G. The first gear G is fixed to the axle 30 and to the arm 25 so that rotation of the gear G swings the arm extension about the axis of the axle 30.

Rotation of the mechanism 5 is achieved by rotation of the shaft 41 using the other hand wheel 18, the shaft 27 being stationary. Rotation of the shaft 41 rotates the gar Q which drives the gear R thus driving the gear S. The gear S drives the gear T which in turn drives the second gear U. This second gear drives the epicyclic gearing and the gear train. Thus gear U drives the ring gear K internally via the planetary gears $O_1$, $O_2$ (since the third gear M and the sun N are stationary as the shaft 27 is stationary) and the ring gear K externally drives the gear J. The gear J drives the gear V which rotates the bevel gear W to drive the bevel gear X which rotates the gear Y. The gear Y drives the gear Z thereby rotating the tube 22 and thus the mechanism 5.

Opening and closing of the jaws 7 is achieved using the handle 16 and trigger 17, the shaft 27 being rotationally stationary. Operation of the trigger 17 moves the shaft 27 axially, when the worm C acts as a rack on the gear H, the gear H revolving to axially move the rack I (and thus the rods 43, 44 relative to the tube 22) to operate the jaws 7. During rotation of the shaft 27 to swing the arm extension 2a, the worm C drives the gear H which travels along the rack I as the arm extension 2a swings round. In this way the jaws 7 can be opened and closed at any position of the arm extension 2a.

During rotation of the shaft 27 to swing the arm extension 2a with the shaft 41 stationary the gear J attempts to revolve on the ring gear K thus tending to rotate the mechanism 5. This interference between the rotational and pivotal movements of the arm extension with respect to the arm is countered in the following manner. Rotation of the shaft 27 rotates the gear B which drives the gear E. Rotation of the gear E rotates the worm L which drives the third gear M. The third gear M and the sun gear N are fixed together, so that the sun gear N rotates in the opposite direction to that in which the ring gear K is tending to rotate, the planetary gears $O_1$, $O_2$, revolving on locked centers since the second gear U is stationary. In this way the gear J remains stationary. The gear J limits back-lash in the joint 6.

The stepped portion 46 is provided in order that a friction device may be incorporated to give a positive reference point for rotation of the mechanism 5.

The hand wheels 18 may be replaced by push button operated electric motors for rotation of the shafts 27, 41. Furthermore it is envisaged that the tongs might be operated by a hydraulic piston and cylinder mounted within the arm extension 2a, thus obviating the racks C, $I_1$ and $I_2$ with their associated pinions. A flexible conduit passing through the joint would supply hydraulic fluid to the piston and cylinder.

The provision of the joint 6 enabling the arm extension 2a to be swung gives the device 1 greater access than that obtained using a common manipulating device providing tong facilities. The joint 6 also enables the mechanism 5 to be rotated by any desired number of turns. This is to be compared with master/slave manipulators in which the use of transmission cables between the master and slave arms limits the number of rotations which can be applied to the slave arm. These transmission cables are also difficult to seal, whereas the sleeve 14 and the gland 15 seal the joint 6 from the contents of the box in which the device 1 is used.

What I claim is:

1. A manipulator comprising a rigid arm, a ball mounting for slidably supporting the arm, operating mechanism at one end of the arm, manipulating mechanism under the control of the operating mechanism, an arm extension by which the manipulating mechanism is carried, a joint between the arm and the arm extension having an axis about which the arm extension may be pivoted with respect to the arm, a yoke in the joint which is mounted for pivotal movement about the joint axis and in which the arm extension is journalled, a first gear mounted on the joint axis and connected to the yoke so that rotation of the first gear causes pivotal movement of the arm extension with respect to the arm, a second gear mounted on the joint axis and connected to the arm extension so that rotation of the second gear causes rotation of the arm extension with respect to the arm, two concentric shafts in the arm which are rotatable by the operating mechanism, gear means including worm drives interconnecting the two shafts with the first and second gears respectively whereby the arm extension can be pivoted or rotated with respect to the arm under the control of the operating mechanism, and a compensating mechanism to restrain interference between rotational and pivotal movements of the arm extension with respect to the arm.

2. A manipulator as claimed in claim 1 wherein the first gear is rigidly connected to the yoke, the second gear is connected with the arm extension through a gear train, and wherein the compensating mechanism is interposed between the second gear and the gear train so that relative rotation between the gear train and the second gear when the arm extension is pivoted with respect to the arm does not cause rotational movement of the arm extension with respect to the arm.

3. A manipulator as claimed in claim 2 wherein the compensating mechanism comprises epicyclic gearing having a sun gear mounted for rotation about the joint axis, a ring gear also mounted for rotation about the joint axis, and planetary gears to interconnect the sun and ring gears, the ring gear having external teeth to engage the gear train, the planetary gears being carried by the second gear and the sun gear being connected to gear means associated with the first gear so that on rotation of the first gear to pivot the arm extension with respect to the arm a compensating rotation is applied by the sun gear to the ring gear, the planetary gears being stationary.

4. A manipulator as claimed in claim 3 wherein the outer concentric shaft is interconnected with the first gear by gear means comprising a first worm shaft, a worm carried by the first worm shaft to mesh with the first gear, a gear carried by the first worm shaft, and a gear carried by the outer concentric shaft to mesh with the gear on the first worm shaft, and wherein a third gear which is similar to the first gear and is rigid with the sun gear of the compensating mechanism is mounted for rotation about the joint axis and is interconnected with the outer concentric shaft by gear means similar to the first mentioned gear means comprising a second worm shaft carrying a worm meshing with the third gear and a gear meshing with the pinion carried by the outer concentric shaft.

5. A manipulator as claimed in claim 1 wherein the manipulating mechanism comprises tongs, a tongs rod encased by the arm extension and axially movable to open and close the tongs, racks mounted on the tongs rod and the outer concentric shaft, and gears mounted for rotation about the joint axis to interconnect the racks whereby axial movement of the outer concentric shaft is transmitted to the tongs rod.

6. A manipulator as claimed in claim 5 wherein the rack mounted on the outer concentric shaft is constituted by a worm so that during rotation of the outer concentric shaft to pivot the arm extension with respect to the arms the gears interconnecting the racks are rotated and the tongs rod is maintained stationary.

References Cited in the file of this patent
UNITED STATES PATENTS

| | | |
|---|---|---|
| 2,595,134 | Gordon | Apr. 29, 1952 |
| 2,632,574 | Goertz | Mar. 24, 1953 |